US007769919B2

(12) United States Patent
Lipps et al.

(10) Patent No.: US 7,769,919 B2
(45) Date of Patent: Aug. 3, 2010

(54) PROTECTING COMPUTER MEMORY FROM SIMULTANEOUS DIRECT MEMORY ACCESS OPERATIONS USING ACTIVE AND INACTIVE TRANSLATION TABLES

(75) Inventors: Daniel Robert Lipps, Kasson, MN (US); Travis James Pizel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 12/120,724

(22) Filed: May 15, 2008

(65) Prior Publication Data

US 2009/0287861 A1 Nov. 19, 2009

(51) Int. Cl.
G06F 13/28 (2006.01)
(52) U.S. Cl. .......................................... 710/28; 710/22
(58) Field of Classification Search ..................... 710/23
See application file for complete search history.

(56) References Cited

U.S. PATENT DOCUMENTS 5,749,093 A * 5/1998 Kobayashi et al. .......... 711/139

2003/0204648 A1 * 10/2003 Arndt ............................ 710/5

* cited by examiner

Primary Examiner—Alford W Kindred
Assistant Examiner—Brooke J Dews
(74) Attorney, Agent, or Firm—Wood, Herron & Evans, LLP

(57) ABSTRACT

A method, apparatus, and program product access memory resources of a computer using a group of direct access memory (DMA) devices. A first DMA device is designated a primary device after association with an active translation table (ATT), while a second DMA device is designated a backup device after association with an inactive translation table (ITT). A translation is entered into the ATT for the first DMA device to permit it to perform a DMA operation, while a translation is inhibited from being entered into the ITT for a second DMA device to prevent it from performing a DMA operation. Thereafter, the roles of the first and second DMA devices may be swapped by associating the first DMA device with the ITT and associating the second DMA device with the ATT. The computer may be a logically partitioned computer of the type that includes a plurality of logical partitions.

25 Claims, 3 Drawing Sheets

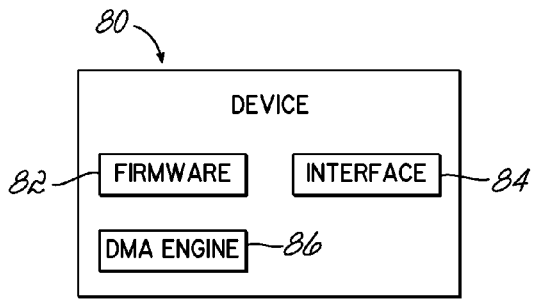
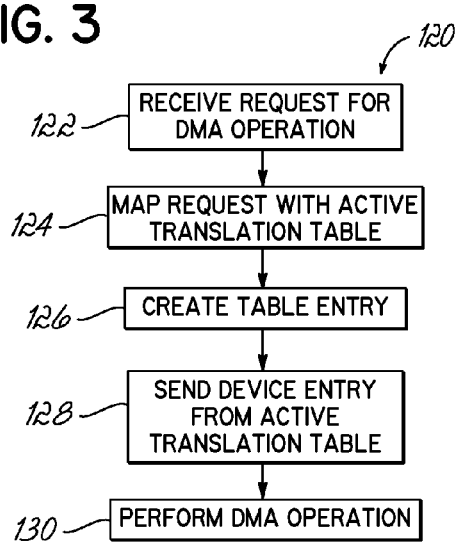
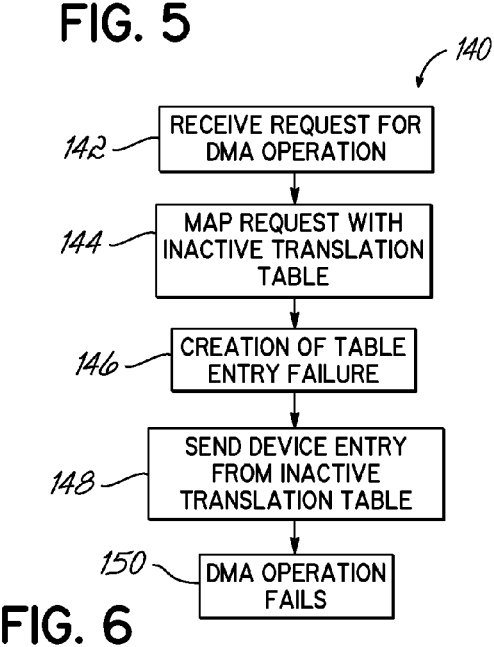
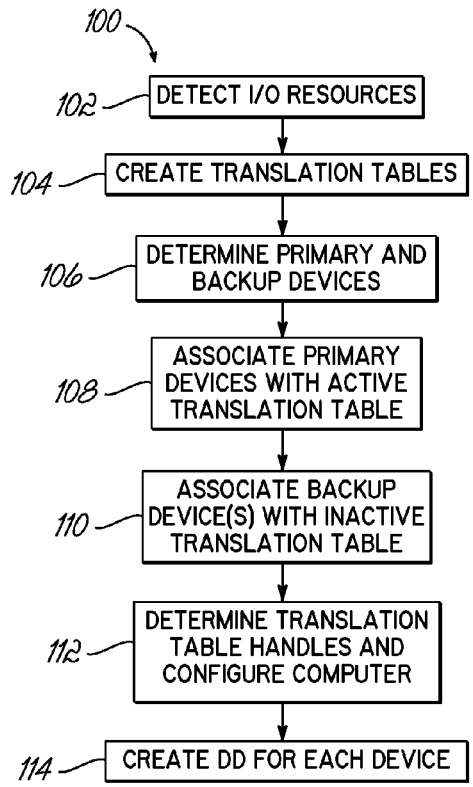
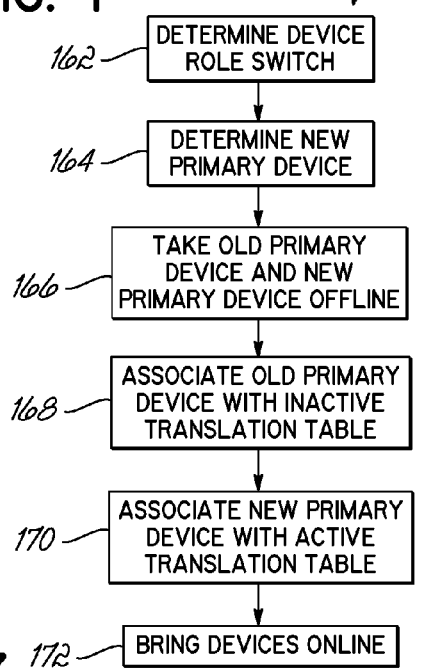

PROTECTING COMPUTER MEMORY FROM SIMULTANEOUS DIRECT MEMORY ACCESS OPERATIONS USING ACTIVE AND INACTIVE TRANSLATION TABLES

FIELD OF THE INVENTION

The present invention relates to computing systems, and more particularly to accessing memory resources of a computing system using direct memory access devices.

BACKGROUND OF THE INVENTION

Modern requirements for a computer may require that it be utilized to run several operating environments at once. In a typical embodiment, a single logically partitioned computer can run a plurality of operating environments in a corresponding plurality of logical partitions. Each operating environment, or operating system, resides in its own logical partition, with each logical partition allocated a part of a processor, an entire processor, or multiple processors of the computer. Additionally, a portion of the computer's memory, one or more devices connected to the computer, and/or other resources of the computer are generally allocated to the logical partitions. From the perspective of each operating system, therefore, the operating system configured on each logical partition operates as if it were running on a separate physical machine having the processor and memory resources to which the logical partition has been allocated. All the logical partitions are under the control of a partition manager. The partition manager is typically a part of the computer firmware and manages the allocation of resources to the operating environments and logical partitions.

Modern requirements for a computer may also require that it be continuously available for extended periods of time. Computers for critical platform implementations are generally configured with a number of identical devices that may be used for the same purpose, such as to access networks, storage devices, workstations, or other resources. However, the computer is generally configured to have only one device be an active device at any given time. In this environment, the active device is normally designated as a "primary device," while the other identical devices are configured as "backup devices" and generally remain idle. Typically, the backup devices have the ability to take the place of the primary device (i.e., take the primary role) some future point should the primary device be taken offline.

Some devices used in primary-backup groups are expected to perform direct access memory ("DMA") operations on memory resources in a computer, e.g., to read and/or write from and to the main or system memory of a computer. In order to utilize backup and primary devices, unique Input/Output ("I/O") translation tables are typically created for each device. These I/O translation tables typically provide mapping from virtual memory addresses visible to the backup and secondary devices to physical memory addresses of the computer. Additionally, the I/O translation tables typically contain one entry (and generally more than one entry) for each device. As such, these tables typically take up significant amounts of space in memory and waste computer resources, as only the I/O translation table associated with a primary device is used for receiving DMA operation requests, mapping memory for the DMA operations, and maintaining entries about each DMA operation at any given time.

Furthermore, complex routines are conventionally required to change the role of a device from a primary device to a backup device, or vice-versa. Generally, for a device to change roles the following must occur: the I/O translations in a translation table of a primary device are unmapped, the I/O translations in a translation table of a backup device are also unmapped, the I/O translations from the translation table of the primary device are mapped into the translation table of the backup device, and the I/O translations from the translation table of the backup device are mapped into the translation table of the primary device. This complex role change normally requires that the computer halt operations while it changes the roles of a primary and backup device, leading to unacceptable downtime and loss of processing capabilities.

In a logically partitioned computer configured with multiple identical devices the problems with primary and backup devices are compounded. For each logical partition, at least one device is configured as a primary device while other devices are configured as backup devices. As such, each logical partition generally controls I/O translation tables for each device (primary or backup) connected to, or in communication with, the logically partitioned computer. Having these multiple I/O tables typically limits the amount of logical memory configured for each logical partition and impairs the operation of software configured on the logical partitions. For example, when a logically partitioned computer with three logical partitions is configured with one-hundred devices, that logical partition typically controls one-hundred I/O translation tables, while other I/O translation tables corresponding to other devices are controlled by other logical partitions.

Additionally, switching roles of primary and backup devices in a logically partitioned computer is generally difficult, as role changes may be replicated throughout the logical partitions configured on the logically partitioned computer, increasing the resources required to change roles of the devices. Thus, to change roles of a primary device and backup device configured a first and second logical partition, respectively, of a logically partitioned computer, control of the I/O translation table of the primary device is released by the first logical partition, control of the I/O translation table of the backup device is released by the second logical partition, the I/O translation table of the primary device is typically modified, the I/O translation table of the backup device is typically modified, control of the new primary device is established by the second logical partition, and control of the new backup device is established by the first logical partition. These modifications are generally replicated to the respective I/O translation tables in the separate logical partitions configured on the logically partitioned computers.

When the devices are capable of DMA operations, there is a strong risk of errant DMA operations that may corrupt memory resources of a computer. This risk is further intensified for logically partitioned computers due to their use of logical memory. For example, conventional logical partitions access various portions of physical memory and utilize them as logical memory. However, the actual address of the physical memory and the address of the logical memory accessed by the conventional logical partitions are typically different. For example, a conventional logical partition may view its logical memory as having addresses 1 through 100. In reality, this logical memory may be mapped to physical memory addresses 1334 to 1384 and 1527 to 1577. Thus, a DMA operation from a DMA device configured to access a logical memory that is errant or malicious generally corrupts the entire memory of the logically partitioned computer, as the DMA operation may access a physical memory address that it should not have access to.

Furthermore, preventing malicious devices from performing DMA operations is generally extremely difficult, if not impossible. For example, if a primary device is compromised or becomes faulty, it typically remains associated with an I/O translation table that allows the device to perform DMA operations. Thus, the memory of the computer can be compromised and/or otherwise vulnerable to faulty or malicious DMA operations.

Consequently, there is a continuing need for improving the management of memory resources of logically partitioned and other types of computers so as to minimize the resources required to implement primary and backup devices, minimize the complexity and downtime of changing the roles of primary and backup devices, and prevent DMA operations by compromised or faulty devices.

SUMMARY OF THE INVENTION

Embodiments of the invention provide for a method, apparatus, and program code that utilize active and inactive translation tables, which are respectively associated with primary and backup DMA devices, to effectively limit DMA access to a primary DMA device within a primary/backup group of DMA devices. In particular, in some embodiments consistent with the invention, DMA devices in a primary/backup group are required to perform DMA operations using the translation table with which they are associated, and in particular, using a translation entry that has been created in the translation table. In such embodiments, the inactive translation table is configured so as to inhibit translation entries from being added to the inactive translation table such that any DMA device that attempts to perform DMA operations using the inactive translation table will not be able to successfully perform such DMA operations. In addition, whenever it is desirable to swap the roles of primary and backup DMA devices (in specific embodiments, in response to failure of a primary DMA device, in response to an attempted malicious DMA operation from a primary DMA device, in response to administrative action to remove a primary DMA device for replacement and/or upgrade, or other failover from a primary DMA device to one of the backup DMA devices) the roles may be swapped simply by changing the associations of the DMA devices being swapped such that the old primary DMA device becomes associated with the inactive translation table and the new primary DMA device becomes associated with the active translation table. In one embodiment, by using two tables the computer does not have to allocate resources for a table for each DMA device, which can save precious storage space and more efficiently deal with the resources of the computing system.

Therefore, consistent with one aspect of the invention, a memory resource of a computing system is accessed using a group of direct access memory ("DMA") devices. A first DMA device from the group of DMA devices is designated as a primary DMA device by associating the first DMA device with an active translation table, which is provided to allow the first DMA device to perform a DMA operation. A plurality of DMA devices from the group of DMA devices are designated as backup DMA devices by associating that plurality of backup DMA devices with an inactive translation table, which is provided to inhibit a backup DMA device from performing a DMA operation. In addition, a translation is entered into the active translation table for the first DMA device while the first DMA device is associated with the active translation table such that the first DMA device is permitted to perform a DMA operation using the active translation table, and a translation is inhibited from being entered into the inactive translation table for a second DMA device from among the plurality of backup DMA devices while the second DMA device is associated with the inactive translation table such that the second DMA device is inhibited from performing a DMA operation using the inactive translation table. In response to a failover from the first DMA device to the second DMA device, the second DMA device is associated with the active translation table to designate the second DMA device as a primary DMA device such that the second DMA device is permitted to perform a DMA operation using the active translation table. The first DMA device may be designated as a backup device such that it is prohibited from performing DMA operations, remain inactive, or be removed.

Consistent with another aspect of the invention, the aforementioned association of a primary DMA device with an active translation table, association of a plurality of backup DMA devices with an inactive translation table, entering of a translation into the active translation table for the first DMA device, inhibiting of a translation from being entered into the inactive translation table for a second DMA device, and failover from the first DMA device to the second DMA device are performed in a logically partitioned computing system using a group of DMA devices, where the logically partitioned computing system is of the type that includes a plurality of logical partitions, and where each of the plurality of logical partitions includes a logical memory associated with a portion of the memory.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 3 is a diagrammatic illustration of the primary software components of a device that can be configured as either a primary or backup device of the computing system or logically partitioned computing system of FIGS. 1 and 2, respectively;

FIG. 4 is a flowchart having steps executable by the logically partitioned computing system of FIG. 2 to initialize management of the devices consistent with principles of the invention;

FIG. 5 is a flowchart having steps executable by the logically partitioned computing system of FIG. 2 to allow a primary device to perform a DMA operation on a memory consistent with principles of the invention;

FIG. 6 is a flowchart having steps executable by the logically partitioned computing system of FIG. 2 to prohibit a backup device from performing a DMA operation on the memory consistent with principles of the invention;

FIG. 7 is a flowchart having steps executable by the logically partitioned computing system of FIG. 2 to change the roles of a primary device and backup device consistent with principles of the invention.

DETAILED DESCRIPTION

Figure 1:
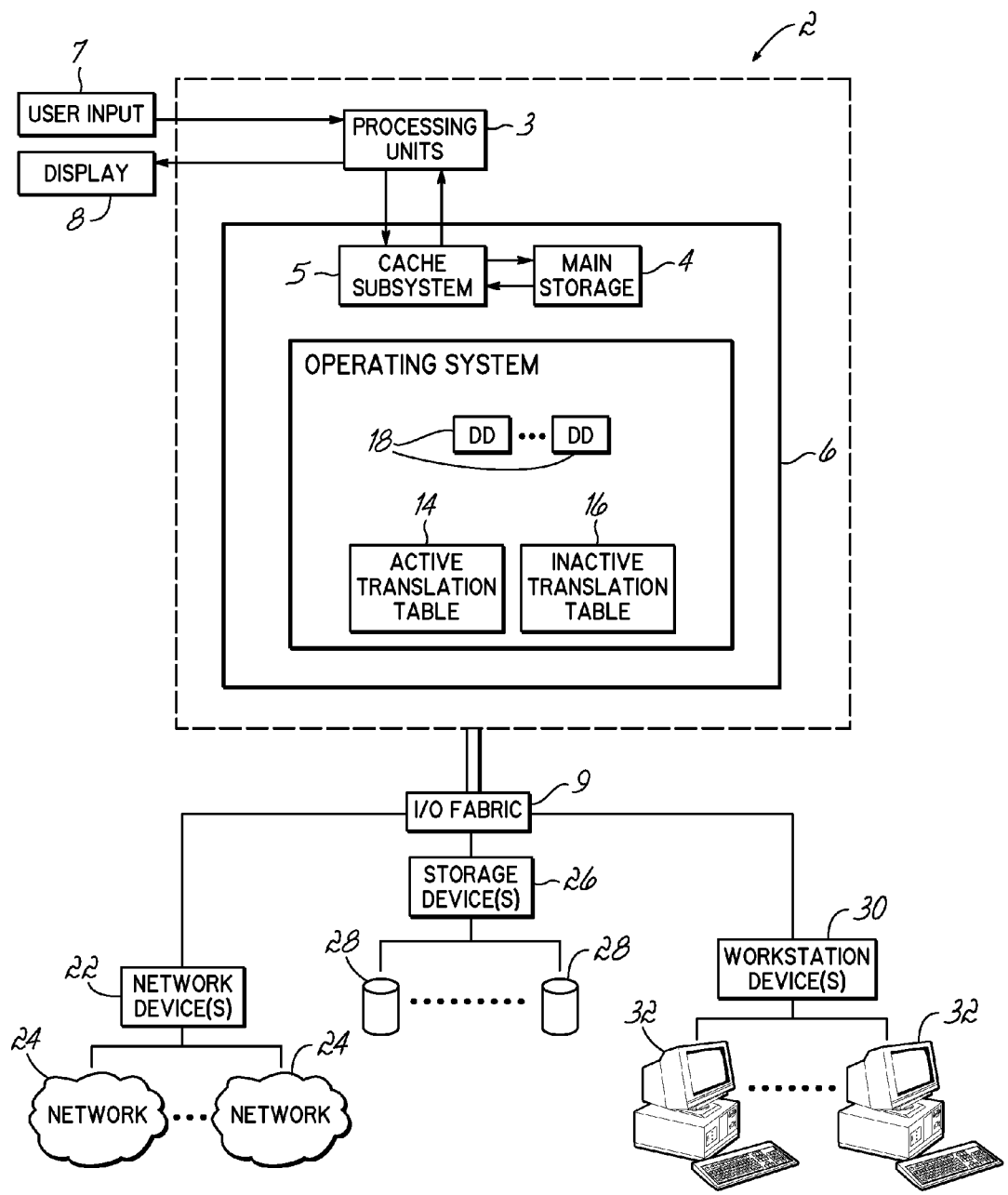
FIG. 1 is a diagrammatic illustration of the primary hardware components of a single-user computing system configured to accomplish management of primary and backup direct memory access ("DMA") devices consistent with principles of the invention.

Features of the present invention include an apparatus, program product and method for accessing a memory resource of a computing system using a group of direct access memory ("DMA") devices. In one embodiment, the computing system is a single-user computing system. In another embodiment, the computing system is a multi-user computing system. In another embodiment, the computing system is a logically partitioned computing system. The computing system includes an active translation table that contains entries accessible by primary DMA device(s) that enable primary DMA devices to perform DMA operations. The computing system also includes an inactive translation table that contains entries accessible by backup DMA devices that prohibits backup DMA devices from performing DMA operations.

In one embodiment, there is provided a method of accessing the memory of the computing system using the group of DMA devices. The method comprises designating a first DMA device from the group as a primary DMA device by associating that first DMA device with the active translation table, and designating a plurality of DMA devices from the group as backup DMA devices by associating the plurality of backup DMA devices with the inactive translation table. The method further comprises entering a translation into the active translation table for the first DMA device while it is associated with the active translation table such that the first DMA device is permitted to perform a DMA operation using the active translation table, and inhibiting a translation from being entered into the inactive translation table for a second DMA device from among the plurality of DMA devices while the second DMA device is associated with the inactive translation table such that the second DMA device is inhibited from performing a DMA operation using the inactive translation table. The method further comprises, in response to a failover from the first DMA device to the second DMA device, associating the second DMA device with the active translation table to designate the second DMA device as a primary DMA device such that the second DMA device is permitted to perform a DMA operation using the active translation table. The first DMA device may be designated as a backup DMA device such that the first DMA device is prohibited from performing a DMA operation using the inactive translation table. In specific embodiments, the failover may occur in response to failure of the first DMA device, in response to an attempted malicious DMA operation from the first DMA device, in response to administrative action and/or need to remove the first DMA device as a primary DMA device (such as when the first DMA device has not necessarily failed, but may be in need of replacement or an upgrade), or other failover from the first DMA device to the second DMA devices.

In the embodiments illustrated hereinafter, the DMA devices access a memory resource such as the main or system memory of a computer. However, it will be appreciated that in other embodiments, other types of memory resources may be accessed by the DMA devices. In general, the invention may be utilized to access any type of memory resource that is generally capable of serving as the target of a DMA operation, so the invention is not limited to the particular type of memory resources described herein.

Thus, embodiments of the present invention address the shortcomings of the prior art. For example, some embodiments are operable to use two translation tables, which decreases the memory footprint required for the translation tables, as well as the number of tables that must be maintained, which thus reduces the amount of otherwise wasted resources. Furthermore, entries in the active translation table may be created as needed, and removed after DMA operations are complete. Furthermore, the inactive translation table may contain zero, one, or few entries. In this way, the present invention does not require the maintenance of large numbers of active translation tables and large numbers of inactive translation tables, thus further reducing the amount of wasted resources. Finally, embodiments of the invention often provide for a quick, easy, and efficient way of switching the operation of a primary DMA device and backup DMA device by simply changing their associations with the active and inactive translation tables.

Hardware and Software Environment

Turning more particularly to the drawings, wherein like representations denote like parts throughout the several views, FIG. 1 illustrates a data processing apparatus 2 consistent with the invention. Apparatus 2, in specific embodiments, may be a computer, computing system, computing device, server, disk array, or programmable device such as a single-user computer, a handheld device, a networked device (including a computer in a cluster configuration), a mobile phone, a video game console (or other gaming system), etc. Apparatus 2 will be referred to as "computing system" or "computer" for the sake of brevity.

Computer 2 generally includes one or more processing units ("processors") 3 coupled to a memory subsystem that includes a main storage 4, which may be an array of random access memory (RAM). Main storage 4 may be partially and/or fully comprised of dynamic random access memory (DRAM), static random access memory (SRAM), flash memory, memristors, hard disk drive, and/or another digital storage medium. Also illustrated as interposed between processors 3 and main storage 4 is a cache subsystem 5, typically including one or more levels of data, instruction and/or combination caches, with certain caches either serving individual processors or multiple processors as is well known in the art. The main storage 4 and cache subsystem 5, collectively, may comprise a "memory subsystem," or "memory" 6. Computer 2 is coupled to a user input 7 operable by a user to input data. Also coupled to computer 2 is a display 8 (e.g., a CRT monitor, an LCD display panel, etc.). Computer 2 is typically configured with an operating system (shown as "OPERATING SYSTEM") that controls the primary operations of the computer 2.

Computer 2 is coupled with an Input/Output ("I/O") fabric 9 that provides access to various external or peripheral devices, e.g., one or more network devices 22 for interfacing the computer 2 with one or more networks 24, one or more storage devices 26 for interfacing the computer 2 with one or more storage devices 28, and one or more workstation devices 30 for interfacing with one or more terminals or workstations 32. The network devices 22, storage devices 26, and workstation devices 30 may be referred to as "devices 22, 26 and 30" for brevity sake.

Each device group (i.e., network devices 22, storage devices 26, and workstation devices 30) may be configured as a primary/backup group with one device that can perform DMA operations on the memory subsystem 6 of computer 2. This device will be referred to as a "primary device" for brevity sake. The primary devices must be able to map the DMA operation to a location in the memory 6 to perform each DMA operations, because the DMA operations performed may include copying data to memory 6, removing data from memory 6, or editing data in memory 6. Each group device that is not a primary device may be configured as a backup device. As such, the backup devices are capable of performing DMA operations yet denied access to perform a DMA operation on the memory 6. By configuring primary and backup devices, simultaneous DMA operations on the memory 6 are prevented, ensuring that the integrity of the memory 6 is maintained.

To perform a DMA operation on the memory 6 of computer 2, the primary device must be capable of mapping a virtual address to the proper physical address of memory 6 that is the target of the DMA operation. As such, the computer 2 may be configured with an active translation table 14 and an inactive translation table 16. In one embodiment, the active translation table 14 is a table that maintains mappings to physical memory addresses in entries that may be provided to the primary device in order to perform a DMA operation on the memory 6 of computer 2. Without the active translation table 14, a primary device attempting to perform a DMA operation may corrupt the memory 6. After receiving information from the active translation table 14, the primary device may be able to perform the DMA operation by mapping the requested virtual address to the proper physical memory address that is the target of the DMA operation, then performing the DMA operation. The inactive translation table 16, however, typically does not contain any valid entries. Instead, the inactive translation table 16 may be used to prevent devices 22, 26 and/or 30 from engaging in simultaneous or malicious DMA operations. The size, or number of entries, of the translation tables 14 and 16 may be determined by the user when the translation tables 14 and 16 are initially configured.

The computer 2 is configured with at least one device driver (referred to, and shown as, "DD") 18 for each primary and backup device that is coupled with the computer 2. The DDs 18 are operable to attempt to create translation table entries (i.e., entries in active translation table 14 and inactive translation table 16) as well as map at least a subset of the memory 6 to use for a DMA operation in response to receiving a DMA operation request from the primary or backup devices. The DDs 18 are also operable to interface with the primary devices and pass along mappings to physical memory addresses, enabling the primary devices to perform DMA operations on the memory 6. A DD 18 may pass along a mapping to a physical memory address from the active translation table 14 in response to a request for a DMA operation from a primary device, but pass along an invalid entry (or fail to return any entry) from the inactive translation table 16 in response to a request for a DMA operation from a backup or malicious device. Thus, the devices 22, 26 and/or 30 may be prevented from engaging in simultaneous or malicious DMA operations.

As shown in FIG. 1, computer 2 may be a typical computing system. One alternate implementation of a computing system may be a logically partitioned computing system as developed by International Business Machines Corporation, of Armonk, N.Y., and as illustrated in FIG. 2.

Figure 2:
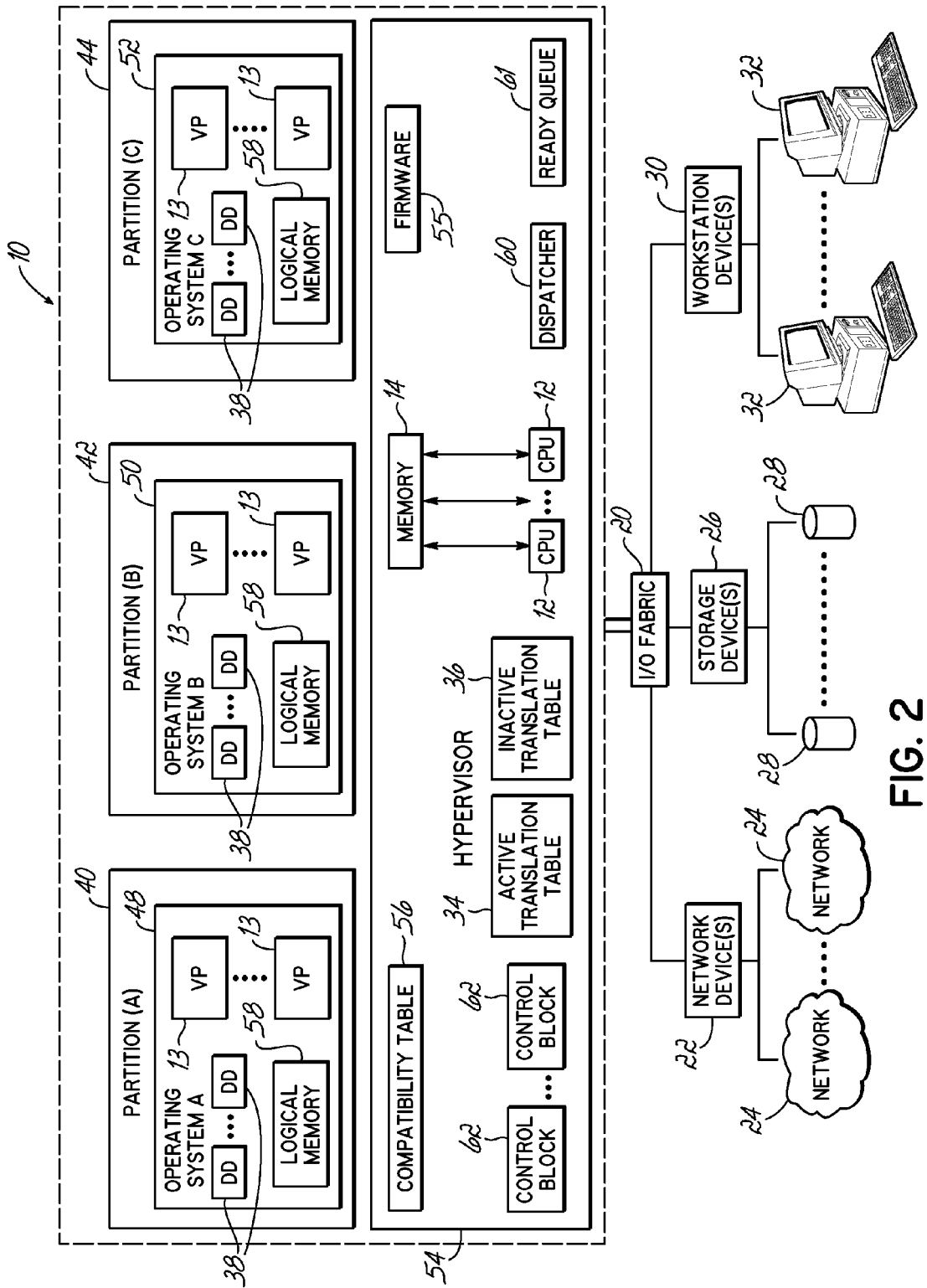
FIG. 2 is a diagrammatic illustration of the primary hardware and software components of a multi-user or logically partitioned computing system configured to accomplish management of primary and backup DMA devices consistent with principles of the invention.

FIG. 2 illustrates an alternate embodiment of a computer 10 that is a logically partitioned computing system 10 (hereafter, "computer" 10). As illustrated, computer 10 includes one or more physical processing units ("processors") 12 coupled to a memory subsystem ("memory") 14. The memory 14 may be comprised of a main storage and cache subsystem in a similar manner and/or in a similar composition as the memory subsystem 6 of FIG. 1. Returning to FIG. 2, the computer 10 may include an I/O fabric 20, and devices 22, 26 and 30. Although not illustrated, one having ordinary skill in the art will appreciate that computer 10 may further include a user input and display (not shown).

The computer 10 may be configured with a plurality of partitions, e.g., partitions 40, 42 and 44, that share common processing resources. Such an architecture may rely upon a single computing machine having one or more processors 12 (as shown in FIG. 2, each processor is designated "CPU") coupled with the memory 14. The processors 12 may execute program code configured to simulate one or more virtual processors 13 in each partition 40, 42 and 44.

The partitions 40, 42 and 44 may logically comprise a portion of computer's processors 12, memory 14, and/or other resources. Each partition 40, 42, 44 typically hosts an operating system 48, 50 and 52 (respectively). In this manner, each partition 40, 42 and 44 operates largely as if it is a separate computer.

An underlying program, called a partition manager or hypervisor 54, may assign and adjust resources allocated to the partitions 40, 42 and 44. For instance, the hypervisor 54 may intercept requests for resources from the operating systems 48, 50 and 52 configured on the partitions 40, 42 and 44 in order to globally share and allocate the resources of computer. If the partitions 40, 42 and 44 within computer 10 are sharing the processor 12 resources, the hypervisor 54 allocates physical processor cycles between the virtual processors 13 of the partitions 40, 42 and 44 sharing the processor 12. Additionally, the hypervisor 54 may share any other resources of computer 10, including the memory 14, other components of the computer 10, and/or devices 22, 26 and 30 coupled to the computer 10 through the I/O fabric 20. The hypervisor 54 may include its own firmware 55 and compatibility table 56. Moreover, for purposes of this specification, the partitions 40, 42 and 44 may use either or both the firmware of that partition and hypervisor 54.

The operating systems 48, 50 and 52 control the primary operations of their respective logical partitions 40, 42 and 44 in a manner similar to the operating system of a non-partitioned computer. Each logical partition 40, 42 and 44 may execute in a separate memory space, represented by logical memory 58. Moreover, each logical partition 40, 42, 44 may be statically and/or dynamically allocated a portion of the available resources of computer 10. For example, each logical partition 40, 42 and 44 may be allocated a portion of memory 14 for use in logical memory 58 in an exclusive manner. Also for example, each logical partition 40, 42 and 44 may share the processors 12 by sharing a percentage of the processor 12 resources. In this manner, the resources of computer 10 may be shared by more than one logical partition.

The hypervisor 54 may include a dispatcher 60 that manages the dispatching of virtual resources to physical resources on a dispatch list, or ready queue 61. The dispatcher 60 may comprise memory that includes a list of the memory 14 allocated as the logical memory 58 for each partition 40, 42 and 44. The ready queue 61 may also comprise memory that includes a list of virtual resources having work that is waiting to be dispatched to a resource of computer 10. As shown in FIG. 1, the hypervisor 54 includes processor control blocks 62 that interface with the ready queue 61 and may comprise memory that includes a list of virtual processors waiting for access on a respective processor 12. There may be one processor control block 62 configured for each processor 12.

The hypervisor 54 may configure each device group (i.e., network devices 22, storage devices 26, and workstation devices 30) with one primary device that can perform DMA operations on the logical memory 58 of each logical partition 40, 42 and/or 44. The primary devices must be provided a mapping to physical memory address that corresponds to a logical or virtual memory address to perform the DMA operations, because the DMA operations performed may include copying data to memory 14, removing data from memory 14, or editing data in memory 14. In a similar manner to the way the hypervisor 54 configures the primary device, the hypervisor 54 may configure each device from a device group that is not a primary device for a logical partition 40, 42 and/or 44 as a backup device for that logical partition 40, 42, and/or 44. Again, the backup devices are denied access to perform a DMA operation on the logical memory 58 of logical partition 40, 42, and/or 44. By configuring primary and backup devices for each logical partition 40, 42, and 44, simultaneous DMA operations on the memory 14 of a logical partition 40, 42 and 44 may be prevented. It will be appreciated by one having ordinary skill in the art that multiple devices may be configured as either primary or backup devices for each logical partition 40, 42, and 44. For example, a network device 22 may be configured as a primary device for logical partition 40, but as a backup device for logical partitions 42 and 44. Similarly, a storage device 26 may be configured as a primary device for logical partition 40, but may not be configured as a backup device for logical partitions 42 and 44. Finally, a fourth workstation device may be configured as a backup device for all the logical partitions 40, 42, and 44 when a first, second, and third workstation device are configured as primary devices for logical partitions 40, 42, and 44 respectively.

To perform a DMA operation on the logical memory 58 of a partition 40, 42 or 44, the primary device must have a mapping to the proper physical address of memory 14 corresponding to a virtual address of the logical memory 58 that is the target of the operation. When performing DMA operations on a logically partitioned computer (such as that shown in FIG. 2), a mapping of virtual addresses to physical addresses may be used to ensure that the primary device can perform DMA operations on the memory 14 without corrupting the memory 14 or otherwise overwriting memory 14 being used to maintain part of another logical partition. As such, the hypervisor 54 may include an active translation table 34 and an inactive translation table 36. In one embodiment, the active translation table 34 is a table that maintains mappings of logical memory addresses to physical memory addresses that may be provided to the primary device in order to perform a DMA operation on the memory 14 of computer 10. Without the active translation table 34, a primary device performing DMA operations may corrupt the memory 14. After receiving information from the active translation table 34, the primary device may be able to perform the DMA operation by mapping the requested virtual address to the proper physical memory address, then performing the DMA operation. The inactive translation table 36 typically does not contain any valid entries. Instead, the inactive translation table 36 may be used to prevent devices 22, 26 and/or 30 from engaging in simultaneous or malicious DMA operations. The size, or number of entries, of the translation tables 34 and 36 may be determined by the user or the hypervisor 54 when the translation tables 34 and 36 are initially configured.

Each logical partition 40, 42 and 44 is configured with at least one device driver (referred to, and shown as, "DD") 38 for each primary and backup device that communicates with that logical partition. The DDs 18 are operable to attempt to create translation table entries (i.e., entries in active translation table 34 and inactive translation table 36) as well as map at least a subset of the memory 14 to use for a DMA operation in response to receiving a DMA operation request from the primary or backup devices. The DDs 38 are also operable to interface with the primary devices and pass along mappings of logical memory addresses to physical memory addresses, enabling the primary devices to perform DMA operations on the memory 14. A DD 38 may pass along a mapping from the active translation table 34 in response to a request for a DMA operation from a primary device, but pass along an invalid entry (or fail to return any entry) from the inactive translation table 36 in response to a request for a DMA operation from a backup or malicious device. Thus, the devices 22, 26 and/or 30 may be prevented from engaging in simultaneous or malicious DMA operations.

FIG. 3 is a diagrammatic illustration of the primary software components and resources used to implement one or more devices 22, 26 and 30 (shown as 80 in FIG. 3) of FIG. 2. Referring back to FIG. 3, each device 80, whether a primary or a backup device, may include device firmware 82, an interface 84, and a DMA engine 86. The interface 84 is configured to communicate with a DD 38 and request access for a DMA operation. If access is granted, the interface 84 may receive a mapping to a physical memory address for the DMA operation, which is in turn performed by the DMA engine 86. If access is not granted, the interface 84 may receive an address for the DMA operation that will prevent the DMA operation. It will be appreciated that the diagrammatic illustration of the primary software components and resources used to implement a device 80 may be used with the devices 22, 26, 30 and computer 2 of FIG. 1 without departing from the scope of the invention.

It will be appreciated that the illustration of components and resources in FIGS. 1-3 are merely exemplary in nature, and that any combination and arrangement of components and/or resources may be allocated to any logical partition in the alternative. For example, it will be appreciated that resources may also be represented in terms of the input/output processors used to interface a computer (i.e., computer 2 or computer 10) with the devices.

It will be further appreciated that the illustrations of memory 2 and memory 14 of FIG. 1 and FIG. 2, respectively, are merely exemplary in nature, and that the present invention is directed towards accessing a "memory resource" rather than the specific embodiments of memory 2, 14 as shown. For example, it will be appreciated by one having ordinary skill in the art that "memory resource," as used hereinafter, may include the main storage 4 and cache subsystem 5 of FIG. 1, the memory 14 of FIG. 2, any RAM (including DRAM, SDRAM, etc.), menristors, or hard disk drives configured with the computers 2 and 10, and any other memory resource as is well known in the art.

The various components and resources illustrated in FIGS. 1-3 may be implemented in a number of manners, including using various computer software applications, routines, components, programs, objects, modules, data structures, etc., referred to hereinafter as "program code." Program code typically comprises one or more instructions that are resident at various times in various memory and storage devices in the computer, and that, when read and executed by at least one processor in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable medium used to actually carry out the distribution. Examples of computer readable media include, but are not limited to tangible, recordable type media such as volatile and non-volatile memory devices, floppy and other removable disks, hard disk drives, electronic memory (including USB memory drives), magnetic tape, optical disks (e.g., CD-ROM's, DVD's, HD-DVD's, Blu-Ray Discs, etc.), among others, and transmission type media such as digital and analog communication links.

Those skilled in the art will recognize that the exemplary environments illustrated in FIGS. 1-3 are not intended to limit the present invention. Though not shown in FIG. 2, for instance, one skilled in the art will appreciate that other partitions may be included within other embodiments of the computer 10, including a partition that comprises part of the hypervisor 54. Furthermore, while multiple processors 3 and 12 are shown in the computers 2 and 10 of FIG. 1 and FIG. 2, respectively, one skilled in the art will appreciate that more or fewer processors 12 may be implemented. Additionally, while three partitions 40, 42 and 44 are shown for computer 10 in FIG. 2, one skilled in the art will appreciate that more or fewer partitions may be implemented, and in one specific embodiment one logical partition may be configured on computer 10. Similarly, while three components for the devices are shown in FIG. 3, one skilled in the art will appreciate that there may be more components, including hardware components, communications modules, network modules, error checking modules, cryptographic modules, and other modules necessary to allow communications from the device to the computer or from the device to their specific network 24, storage device 28, or workstation 32. Furthermore, one skilled in the art will appreciate that the device groups 22, 26 and 30 are merely exemplary, and that any other devices capable of performing DMA operations may be used in embodiments consistent with the invention. Other alternative hardware and/or software environments may thus be used without departing from the scope of the invention.

Initializing Partition Protection

The remaining FIGS. 4-7 are flowcharts illustrating various steps of program code that may be executed by the computer 10 of FIG. 2 consistent with embodiments of the invention. It will be appreciated by one having ordinary skill in the art that the flowcharts illustrated in FIGS. 4-7 may be applicable to the computer 2 of FIG. 1.

FIG. 4 illustrates the flowchart 100 for one initialization of memory resource access consistent with embodiments of the present invention. This initialization may occur during or after power-on procedures of the computer 10. In block 102, the program code detects the I/O resources of the computer 10. In one embodiment, the program code may analyze the I/O fabric 20 to determine the devices 22, 26 and 30 coupled to the computer 10. In alternate embodiments, the program code may analyze a user-generated list that specifies the devices 22, 26 and 30 coupled to the computer 10.

The program code creates translation tables 34 and 36 in block 104. Advantageously, each entry in each table 34, 36 includes inactive DMA read and DMA write access bits. In this way, no inadvertent DMA operation may be performed on a memory resource. For example, the devices 22, 26 and 30 may maliciously and/or mistakenly attempt a DMA operation directly on the memory resource of computer 10 without accessing a DD 38 associated with that device 22, 26 or 30. By setting the DMA read and DMA write access bits to inactive, the program code prevents DMA operations by the devices 22, 26 and 30.

In block 106, the program code determines which devices 22, 26 and 30 are the primary and backup devices for the computer 10. This includes determining which devices 22, 26, and 30 are the primary and backup devices for each logical partition 40, 42 and 44. In some embodiments, a user configures the primary and backup devices for each logical partition 40, 42 and 44 during the initial configuration of the logical partitions 40, 42 and 44. In alternate embodiments, the program code may determine which devices 22, 26 and 30 are the primary and backup devices based on the amount of traffic to each device, the proximity of the devices to the computer 10, the delay in communication between the computer 10 and devices 22, 26 and 30, or any other manner that may be well known in the art.

The primary devices are associated with the active translation table 34 in block 108. In one embodiment, the program code writes to the DMA engine 86 of each primary device and associates the DMA engines 86 with the active translation table 34. In this way, each primary device may access an entry in the active translation table 34 to perform a DMA operation. Similarly, in block 110 the program code associates backup devices with the inactive translation table 36. In one embodiment, the program code writes to the DMA engine 86 of each backup device and associates the DMA engines 86 with the inactive translation table 36. In this way, each backup device may access the inactive translation table 36, thus prohibiting each backup device from performing a DMA operation.

The program code performs the initial program load of the partitions 40, 42 and 44 in block 112. In this embodiment, the program code initiates the operation of each partition 40, 42 and 44 and configures each partition 40, 42 and 44 with information about the primary devices and backup devices allocated to that partition 40, 42 or 44. As such, each partition 40, 42 and 44 may be notified of each device coupled to the computer 10 and whether that device is a primary or backup device for that logical partition 40, 42 and 44. Each partition 40, 42 and 44 is also passed a translation table handle for each device. The translation table handle is a unique identifier for each device and used when attempting to alter the translation tables 34 and 36 in response to a request to perform a DMA operation. Each translation table handle may be generated by the hypervisor 54 and stored in memory 14.

In block 114, the program code creates a DD 38 for each device coupled to the computer 10. In particular, the program code creates a DD 38 in each partition 40, 42, and 44 for each device allocated to that partition 40, 42 and 44, and associates each DD 38 with the translation table handle that corresponds to the device for which it is configured. In this embodiment, a DD 38 and a translation table handle are associated with each primary and backup device of each partition 40, 42 and 44. The DD 38 may act as an interface for the devices 22, 26 and 30 to perform DMA operations.

Allowing DMA Operations of a Primary Device

FIG. 5 illustrates a flowchart 120 to allow a DMA operation on a memory resource by a primary device consistent with embodiments of the invention. In block 122, a DD 38 associated with a primary device receives a request for a DMA operation. In block 122, the DD 38 verifies that the primary device requesting the DMA operation is the device for which the DD 38 is associated. When the primary device is not the device associated with the DD 38, the DD 38 ignores the request. In one embodiment, when the primary device is associated with the DD 38, the DD 38 allocates storage in the logical memory 58 of that logical partition 40, 42, or 44 associated with that DD 38 in block 122. In an alternate embodiment, when the primary device is associated with the DD 38, the DD 38 allocates storage in the active translation table 34 in block 122. In that embodiment, DMA operation entries and storage can all be managed at the active translation table 34.

The DMA operation request may specify a logical memory address associated with a logical partition 40, 42 or 44 of computer 10 on which to perform the DMA operation. This logical memory address must be converted into a proper memory resource address to avoid corrupting the memory resource. The DD 38 may send a DMA operation communication to the active translation table 34 in block 124. The DMA operation communication may include the translation table handle for that primary device requesting a DMA operation and associated with that DD 38, as well as the logical memory address upon which the device requests to perform the DMA operation. However, the hypervisor 54 intercepts the DMA operation communication and reads the translation table handle, verifies that a primary device is attempting a DMA operation, and maps the logical memory address into a memory resource address in block 124. When the hypervisor 54 is unable to verify that the device is a primary device (i.e., a device is attempting a malicious DMA operation), the hypervisor 54 may declare an error and associate that device with the inactive translation table 36.

In block 126, the program code creates an active translation table entry that includes the memory resource address that is the target of the logical memory address of the DMA operation request, as well as the translation table handle of the primary device that made the DMA operation request. In block 126, the program code also sets the DMA read and DMA write access bits for the newly created active translation table entry to active. In this way, the newly created active translation table entry indicates the memory resource address for a DMA operation, that the data at that memory resource address may be read and/or edited during a DMA operation, and the specific primary device that is associated with that newly created active translation table entry.

In block 128, the program code may send an active translation table token and the translation table handle of the primary device to the DD 38 that sent the DMA operation communication. The active translation table token may include information sufficient for the primary device to access the newly created active translation table entry associated with its DMA operation. By sending the translation table handle, the program code also ensures that the correct primary device is associated with the correct active translation table token. In block 128, the DD 38 verifies that it was sent the correct translation table handle of the primary device associated with that DD 38. When the translation table handle is verified, the DD 38 may interface with the primary device interface 84 and pass the primary device the active translation table token. In block 128, the DD 38 may also send a confirmation signal that informs the primary device that it is authorized to perform the DMA operation.

In block 130, the primary device receives the active translation table token and/or the confirmation signal from the DD 38 and attempts to use the active translation table token to access the newly created active translation table entry in the active translation table 34. As discussed above, primary devices are associated with the active translation table 34. As such, the primary devices automatically resolve to the active translation table 34 and attempt to read the newly created active translation table entry associated with the active translation table token. In response to reading the newly created active translation table entry associated with the active translation table token and determining that the DMA read and DMA write access bits are set to active, the primary device initiates the DMA engine 86 and performs the DMA operation on the memory resource address from the newly created active translation table entry. In block 130, in one embodiment, when the DMA operation is complete the program code is configured to erase the newly created active translation table entry, thus reducing the size of the active translation table 34 and maintaining security consistent with one active translation table entry, one DMA operation. In block 130, in an alternate embodiment, when the DMA operation is complete, the program code is configured to set the DMA write and DMA read access bits for that newly created active translation table entry to inactive, thus preventing other DMA devices from using the newly created active translation table entry to perform DMA operations.

Denying DMA Operations of a Backup Device

FIG. 6 illustrates a flowchart 140 to deny a DMA operation by a backup device consistent with the invention. In block 142, a DD 38 associated with a backup device receives a request for a DMA operation. In one embodiment, the DD 38 for the backup device allocates storage in the logical memory 58 of that logical partition 40, 42, or 44 associated with that DD 38 in block 144. In an alternate embodiment, the DD 38 for the backup device allocates storage in the inactive translation table 36 in block 144.

The DMA operation request may specify a logical memory address associated with a logical partition 40, 42 or 44 of computer 10 on which to perform the DMA operation. This logical memory address must be converted into a proper memory resource address to avoid corrupting the memory resource. The DD 38 may send a DMA operation communication to the inactive translation table 36 in block 144. The DMA operation communication may include the translation table handle for that backup device requesting a DMA operation and associated with that DD 38, as well as the logical memory address upon which the device requests to perform the DMA operation.

In block 146, the program code analyzes the translation table handle and determines that a backup device is requesting the DMA operation. In response to determining that the backup device is attempting to perform a DMA operation, the program code attempts to create a translation table entry in the inactive translation table 36, but may be denied in block 146. The inactive translation table 36, in one embodiment, is a table that cannot be changed and contains only entries with all DMA read and DMA write access bits set to inactive. In block 146, the program code may note an error in the creation of an entry in the inactive translation table 36.

In block 148, the program code may send an inactive translation table token and the translation table handle of the backup device to the DD 38 that sent the DMA operation communication. The inactive translation table token may include information sufficient for the backup device to access an entry in the inactive translation table 36. In block 148, the DD 38 may interface with the backup device interface 84 and pass the backup device the inactive translation table token.

In block 150, the backup device receives the inactive translation table token and may attempt to use the inactive translation table token to access an entry in the inactive translation table 36. As discussed above, the backup devices are associated with the inactive translation table 36. As such, the backup devices automatically resolve to the inactive translation table 36 to read the inactive translation table entry associated with the inactive translation table token. Also in block 150, the backup device initiates its DMA engine 86 and attempts to perform the DMA operation on the memory resource but fails because all inactive translation table entries deny DMA read or DMA write operations. In one embodiment, to ensure further security, all inactive translation tables entries specify an address of the memory resource that does not exist, or is otherwise null. The backup device may declare a failure or error when it attempts to perform the DMA operation but fails.

Embodiments consistent with the present invention are also operable to protect the computer from malicious DMA operations. For example, a malicious adapter may spontaneously generate a DMA operation request using a random translation table token of either the active translation table 34 or inactive translation table 36. However, all DMA write and DMA read access bits are configured to be set to inactive in the inactive translation table 36 and set to inactive and/or deleted from the active translation table 34 after use. As such, a DMA operation request that is malicious and/or that uses random translation table tokens to access an active translation table entry may not proceed. Similarly, a DMA operation request uses an inactive translation table entry to access an inactive translation table may not proceed.

Swapping Primary and Backup Devices

A need may develop to swap a device 22, 26 or 30 from a primary role to a backup role, and/or vice versa. In some specific embodiments, this need may arise due to an administrative need to replace and/or upgrade the device, an error occurring in the device, a failure of the device, an attempted malicious DMA operation of the device, or other need to swap the roles of a primary and backup device. FIG. 7 illustrates a flowchart 160 to swap the roles of primary and backup devices. In block 162, the program code determines a need for a device 22, 26 or 30 to swap roles. This determination may be made by a DD 38 associated with a primary device, a DD 38 associated with a backup device, or the computer 10. In other embodiments, this determination may be made in response to user input, in response to removal of a primary device, or in response to a loss of communication with a primary device. As such, a primary device may become a backup device, be removed, or simply be deactivated. Similarly, a backup device may become a primary device. Thus, in block 162 the program code determines which device 22, 26, or 30 is the old primary device ("first device") when it determines the need for a role swap. In block 164, the program code determines which device 22, 26 or 30 will become the new primary device ("second device").

In block 166, the program code begins the process of reassigning the primary and backup device by deactivating the first device and the second device. In block 166, the program code may send a command to the first device and the second device to deactivate, stop sending DMA operation requests, or halt all operations except for low-level maintenance operations. In block 168, the program code may write to the DMA engine 86 of the first device and associate that first device with the inactive translation table 36. In this way, the first device is now associated with the inactive translation table 36 and prohibited from performing a DMA operation. Similarly, in block 170 the program code may write to the DMA engine 86 of the second device and associate that second device with the active translation table 34. In this way, the second device is now associated with the active translation table 34 and may perform a DMA operation. As such, the swap provides for switching between two translation tables, and does not require that a new table be created, or control be switched, for either the first and second device upon switching from primary to backup, or vice versa. Additionally, the swap does not require that data be exchanged from the translation tables 34, 36.

To complete the reassignment, the program code activates the second device (i.e., a primary device) and the first device (i.e., a backup device) in block 172. Alternatively, the program code may not activate the first device, and an operator may remove the first device. The second device may perform DMA operations and the first device may be prohibited from performing DMA operations in a similar manner as to that described above.

While the present invention has been illustrated by a description of various embodiments and while these embodiments have been described in considerable detail, it is not the intention of the applicants to restrict, or in any way limit, the scope of the appended claims to such detail. For instance, another embodiment of the computer 10 of FIG. 2 consistent with the invention supports fewer or more logical partitions than those illustrated or described. Additionally, another embodiment consistent with the invention supports additional types of devices, or fewer types of devices than those shown in FIG. 1 and FIG. 2.

Additionally, one having ordinary skill in the art will appreciate that the flowcharts illustrated in FIGS. 4-7 are merely exemplary, and similar program code may be executed by the computer 2 of FIG. 1 without departing from the scope of the present invention. Furthermore, one having ordinary skill in the art will appreciate that some of the blocks of the flowcharts illustrated in FIGS. 4-7 may be reordered without departing from the scope of the present invention. As such, additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of accessing a memory resource of a computing system using a group of direct memory access (DMA) devices, the method comprising:
    designating a first DMA device from the group of DMA devices as a primary DMA device by associating the first DMA device with an active translation table;
    designating a plurality of DMA devices from the group of DMA devices as backup DMA devices by associating the plurality of backup DMA devices with an inactive translation table;
    entering a translation into the active translation table for the first DMA device while the first DMA device is associated with the active translation table such that the first DMA device is permitted to perform a DMA operation using the active translation table;
    inhibiting a translation from being entered into the inactive translation table for a second DMA device from among the plurality of backup DMA devices while the second DMA device is associated with the inactive translation table such that the second DMA device is inhibited from performing a DMA operation using the inactive translation table; and
    in response to a failover from the first DMA device to the second DMA device, associating the second DMA device with the active translation table to designate the second DMA device as a primary DMA device such that the second DMA device is permitted to perform a DMA operation using the active translation table.

2. The method of claim 1, further comprising:
    in response to the failover from the first DMA device to the second DMA device, associating the first DMA device with the inactive translation table to designate the first DMA device as a backup DMA device such that the first DMA device is inhibited from performing a DMA operation using the inactive translation table.

3. The method of claim 1, wherein the failover from the first DMA device to the second DMA device is initiated in response to identifying a failure of the first DMA device.

4. The method of claim 1, wherein the failover from the first DMA device to the second DMA device is initiated in response to detecting a malicious DMA operation by the first DMA device.

5. The method of claim 1, wherein the failover from the first DMA device to the second DMA device is initiated in response to detecting an administrative need for the second DMA device to perform a DMA operation.

6. The method of claim 1, wherein the translation is entered into the active translation table in response to receiving a request for a DMA operation from the first DMA device.

7. The method of claim 1, wherein the inactive translation table is a read-only table.

8. A method of accessing a memory resource of a logically partitioned computing system using a group of direct memory access (DMA) devices, wherein the logically partitioned computing system is of the type that includes a plurality of logical partitions, and wherein each of the plurality of logical partitions includes a logical memory associated with a portion of the memory, the method comprising:
   designating a first DMA device from the group of DMA devices as a primary DMA device by associating the first DMA device with an active translation table;
   designating a plurality of DMA devices from the group of DMA devices as backup devices by associating the plurality of backup DMA devices with an inactive translation table;
   entering a translation into the active translation table for the first DMA device while the first DMA device is associated with the active translation table such that the first DMA device is permitted to perform a DMA operation on the portion of memory associated with the logical memory of a logical partition using the active translation table;
   inhibiting a translation from being entered into the inactive translation table for a second DMA device from among the plurality of backup DMA devices while the second DMA device is associated with the inactive translation table such that the second DMA device is inhibited from performing a DMA operation on the portion of the memory associated with the logical memory of the logical partition using the active translation table; and
   in response to a failover from the first DMA device to the second DMA device, associating the second DMA device with the active translation table to designate the second DMA device as a primary DMA device such that the second DMA device is permitted to perform a DMA operation on the portion of the memory associated with the logical memory of the logical partition using the active translation table.

9. The method of claim 8, further comprising:
   in response to the failover from the first DMA device to the second DMA device, associating the first DMA device with the inactive translation table to designate the first DMA device as a backup DMA device such that the first DMA device is inhibited from performing a DMA operation on the portion of the memory associated with the logical memory of the logical partition using the inactive translation table.

10. The method of claim 8, wherein the failover from the first DMA device to the second DMA device is initiated in response to identifying a failure of the first DMA device.

11. The method of claim 8, wherein the failover from the first DMA device to the second DMA device is initiated in response to detecting a malicious DMA operation by the first DMA device.

12. The method of claim 8, wherein the failover from the first DMA device to the second DMA device is initiated in response to detecting an administrative need for the second DMA device to perform a DMA operation.

13. The method of claim 8, wherein each translation entered into the active translation table includes a mapping of the logical memory associated with the logical partition to the portion of the memory of the logically partitioned computing system associated with that logical memory.

14. The method of claim 8, wherein the translation is entered into the active translation table in response to receiving a request for a DMA operation from the first DMA device.

15. The method of claim 14, wherein the request includes information about the logical memory of the logical partition to be modified by the DMA operation.

16. The method of claim 8, wherein the first DMA device is designated a primary DMA device for the logically partitioned computing system.

17. The method of claim 8, wherein the first DMA device is designated a primary DMA device for the logical partition from among the plurality of logical partitions.

18. The method of claim 8, wherein the first DMA device and the second DMA device are designated to the same logical partition chosen from among the plurality of logical partitions.

19. The method of claim 8, wherein the inactive translation table is a read-only table.

20. A computing system, comprising:
   a group of direct memory access (DMA) devices;
   at least one processor; and
   program code configured to be executed by the at least one processor to access a memory resource of the computing system using the group of DMA devices, the program code further configured to designate a first DMA device from the group of DMA devices as a primary DMA device by associating the first DMA device with an active translation table, designate a plurality of DMA devices from the group of DMA devices as backup DMA devices by associating the plurality of backup DMA devices with an inactive translation table, enter a translation into the active translation table for the first DMA device while the first DMA device is associated with the active translation table such that the first DMA device is permitted to perform a DMA operation using the active translation table, inhibit a translation from being entered into the inactive translation table for a second DMA device from among the plurality of backup DMA devices while the second DMA device is associated with the inactive translation table such that the second DMA device is inhibited from performing a DMA operation using the inactive translation table, and, in response to a failover from the first DMA device to the second DMA device, associate the second DMA device with the active translation table to designate the second DMA device as a primary DMA device such that the second DMA device is permitted to perform a DMA operation using the active translation table.

21. The apparatus of claim 20, wherein the program code is further configured to associate the first DMA device with the inactive translation table to designate the first DMA device as a backup DMA device such that the first DMA device is inhibited from performing a DMA operation using the inactive translation table in response to the failover from the first DMA device to the second DMA device.

22. The apparatus of claim 20, wherein the failover from the first DMA device to the second DMA device is initiated in response to identifying a failure of the first DMA device.

23. The apparatus of claim 20, wherein the failover from the first DMA device to the second DMA device is initiated in response to detecting a malicious DMA operation by the first DMA device.

24. The apparatus of claim 20, wherein the translation is entered into the active translation table in response to receiving a request for a DMA operation from the first DMA device.

25. A recordable storage media, comprising:
  program code configured to be executed by at least one processor to access a memory resource of a computing system using a group of direct memory access (DMA) devices, the program code further configured to designate a first DMA device from the group of DMA devices as a primary DMA device by associating the first DMA device with an active translation table, designate a plurality of DMA devices from the group of DMA devices as backup DMA devices by associating the plurality of backup DMA devices with an inactive translation table, enter a translation into the active translation table for the first DMA device while the first DMA device is associated with the active translation table such that the first DMA device is permitted to perform a DMA operation using the active translation table, inhibit a translation from being entered into the inactive translation table for a second DMA device from among the plurality of backup DMA devices while the second DMA device is associated with the inactive translation table such that the second DMA device is inhibited from performing a DMA operation using the inactive translation table, and, in response to a failover from the first DMA device to the second DMA device, associate the second DMA device with the active translation table to designate the second DMA device as a primary DMA device such that the second DMA device is permitted to perform a DMA operation using the active translation table;
and a computer readable medium storing the program code.

* * * * *